(12) United States Patent
Kwon et al.

(10) Patent No.: US 7,567,285 B2
(45) Date of Patent: Jul. 28, 2009

(54) CAMERA LENS DEVICE FOR SUPPRESSING REFLECTION WAVES GENERATED BY INCIDENT WAVES

(75) Inventors: Seong-Geun Kwon, Daegu (KR); Kuhn-Il Lee, Daegu (KR); Kyu-Ik Sohng, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 11/090,311

(22) Filed: Mar. 28, 2005

(65) Prior Publication Data
US 2005/0226608 A1 Oct. 13, 2005

(30) Foreign Application Priority Data
Mar. 26, 2004 (KR) ............... 10-2004-0020788

(51) Int. Cl.
*H04N 5/225* (2006.01)
(52) U.S. Cl. ..................................... 348/335
(58) Field of Classification Search ............... 348/355, 348/208.11, 335, 338–340; 396/91, 432, 396/506, 534, 535; 359/576
See application file for complete search history.

(56) References Cited

U.S. PATENT DOCUMENTS

| | | | |
|---|---|---|---|
| 5,353,070 A * | 10/1994 | Mitani et al. | 348/781 |
| 5,612,085 A * | 3/1997 | Mitani et al. | 427/162 |
| 2002/0131782 A1* | 9/2002 | Yamaguchi et al. | 396/429 |
| 2003/0211405 A1* | 11/2003 | Venkataraman | 430/7 |
| 2004/0051950 A1* | 3/2004 | Noguchi | 359/603 |
| 2004/0105173 A1* | 6/2004 | Yamaguchi et al. | 359/793 |
| 2004/0234780 A1* | 11/2004 | Koenig et al. | 428/432 |

FOREIGN PATENT DOCUMENTS

| | | |
|---|---|---|
| JP | 59-158130 | 10/1984 |
| JP | 2000-111702 | 4/2000 |
| JP | 2001-033712 | 2/2001 |
| JP | 2001-324676 | 11/2001 |
| JP | 2002-014203 | 1/2002 |
| JP | 2002-014204 | 1/2002 |
| JP | 2002-043553 | 2/2002 |
| JP | 2002-247455 | 8/2002 |
| JP | 2003-266580 | 9/2003 |
| JP | 2003-270506 | 9/2003 |

* cited by examiner

*Primary Examiner*—James M Hannett
(74) *Attorney, Agent, or Firm*—Roylance, Abrams, Berdo & Goodman, L.L.P.

(57) ABSTRACT

An optical device for a camera including a lens array for focusing incident optical signals, a window glass positioned in front of the lens array to prevent alien substances from contacting the lens array, and a barrel for retaining the lenses of the lens array, wherein each lens of the lens array is coated with multi-layered thin films to suppress respective reflection waves of incident optical signals having different wavelengths, and of such a thickness that causes the phase of reflection waves reflected through the thin films to be the inverse of the phase of reflection waves reflected at the surface of the lens.

13 Claims, 11 Drawing Sheets

CAMERA LENS DEVICE FOR SUPPRESSING REFLECTION WAVES GENERATED BY INCIDENT WAVES

CROSS-REFERENCE TO RELATED APPLICATIONS

This application claims the benefit under 35 U.S.C. §119 (a) of Korean Patent Application No. 10-2004-0020788 entitled "Camera Lens Device For Suppressing Reflection Waves Generated By Incident Waves" filed with the Korean Intellectual Property Office on Mar. 26, 2004, the entire disclosure of which is incorporated herein by reference.

BACKGROUND OF THE INVENTION

1. Field of the Invention

The present invention relates to an optical device for a camera device. More particularly the present invention relates to a device that is capable of suppressing the reflection of incident optical signals.

2. Description of the Related Art

In general, a camera device has a lens array and converts incident optical signals into electrical signals, which are processed into desired images for display or storage. Portable terminals are equipped with such a camera for multi-function service. Particularly, mobile telephones are often equipped with such a camera. When mounted on a portable terminal, however, the camera has a limited size. This is an obstacle to improving the resolution.

Figure 1:
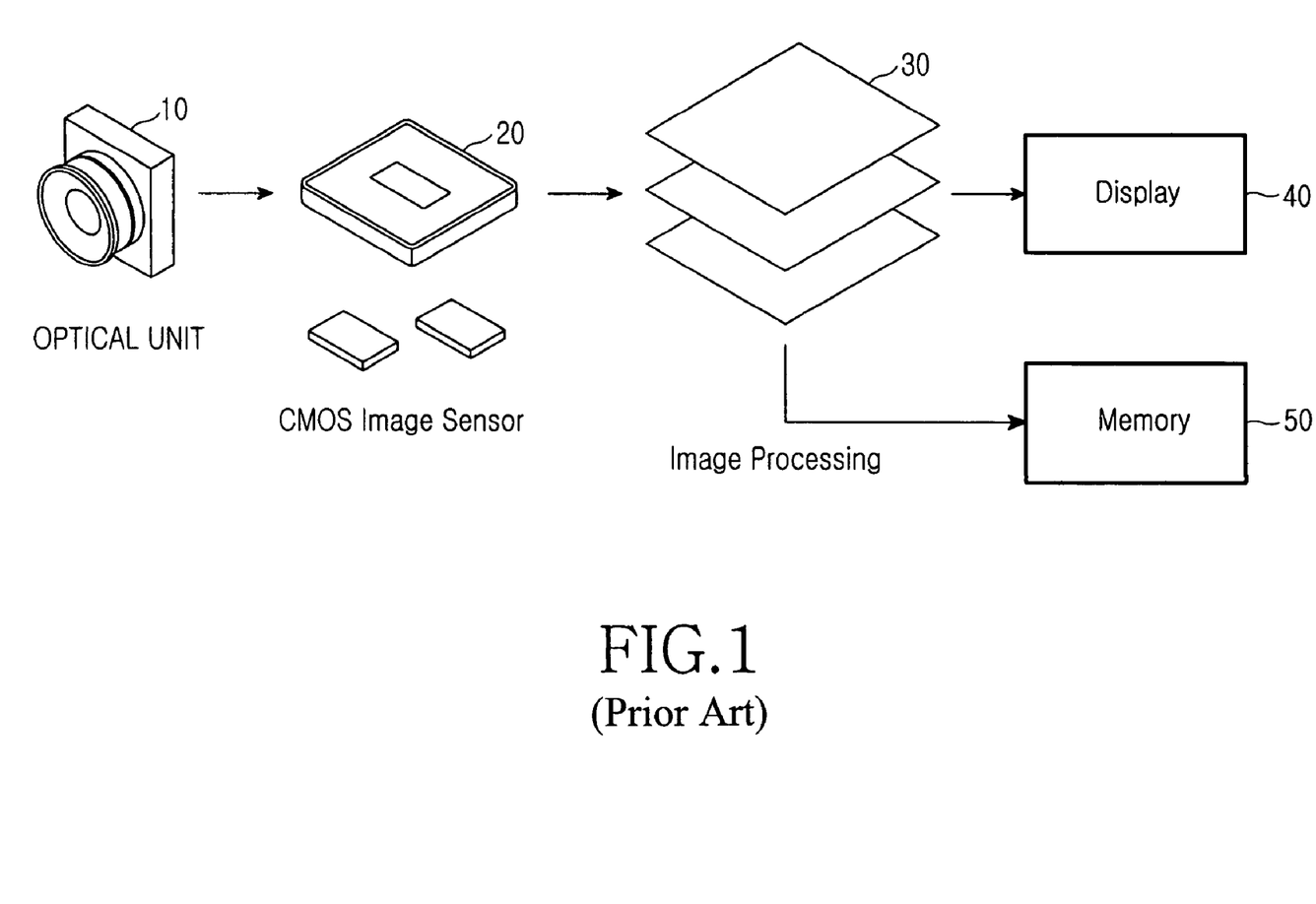
FIG. 1 shows a conventional procedure for processing image signals photographed by a device equipped with a camera.

FIG. 1 shows an example construction for processing image signals photographed by a camera device for display or storage.

Referring to FIG. 1, an optical unit 10 has a lens array and generates optical signals of photographed images. An image sensor unit 20 (such as a CMOS image sensor) converts the photographed optical signals into electrical signals. An image processing unit 30 processes the image signals output from the image sensor unit 20. The image data processed by the image processing unit 30 is output to a display unit 40 to be displayed or to a memory 50 to be saved.

Factors affecting the resolution of images in a camera device configured as shown in FIG. 1 include non-uniformity of the lenses constituting the optical unit 10, a flare phenomenon of the optical unit 10, a halation phenomenon of the image sensor unit 20, and white clip, linearity, dark current, and noise of the image processing unit 30. The most critical factor among them is related to the optical unit 10. If the image resolution degrades in the optical unit 10, the following image processing unit 30 has a limitation on its ability for improving images. Therefore, problems related to the optical unit 10 must be solved first.

Figure 2:
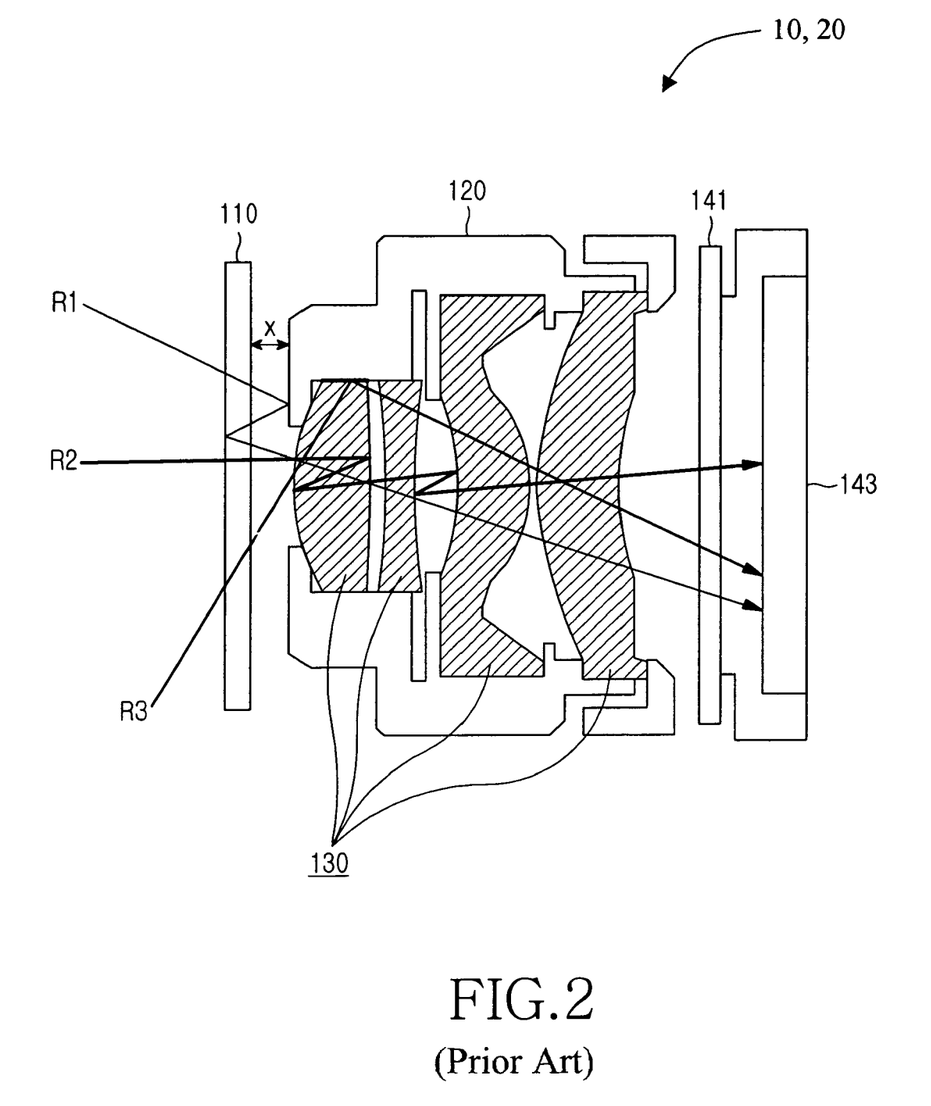
FIG. 2 shows a conventional construction of an optical unit of the camera shown in FIG. 1.

FIG. 2 shows a conventional construction of the optical unit 10 and the image sensor unit 20 shown in FIG. 1.

Referring to FIG. 2, a window glass 110 is positioned in front of a lens array 130 and prevents alien substances from contacting the lens array 130. A barrel 120 retains the lenses of the lens array 130, and the interior of the barrel 120 has a structure adapted to retain each lens of the lens array 130. The lens array 130 performs the function of focusing incident optical signals of photographed objects. The lens array 130 may include a focusing lens, a variator lens, a compensator lens, an elector lens, and a relay lens. Each lens may have an array of a number of lenses to perform each corresponding function. When used in a small portable terminal, the lens array 130 may include only a focusing lens. The focusing lens performs the function of forming the same focus regardless of the focal length.

An infrared filter 141 performs the function of interrupting infrared rays from incident optical signals. The infrared filter 141 may be positioned on the front or rear of the window glass 110. An image sensor 143 is also provided at the rear of the window glass 110.

Figure 3A:
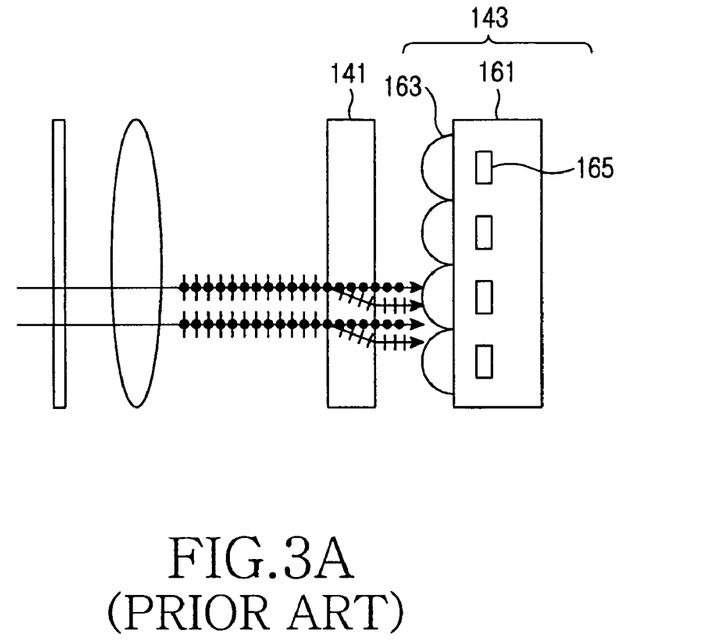
FIGS. 3*a* and 3*b* show the structure of a conventional image sensor unit shown in FIG. 2.
Figure 3B:
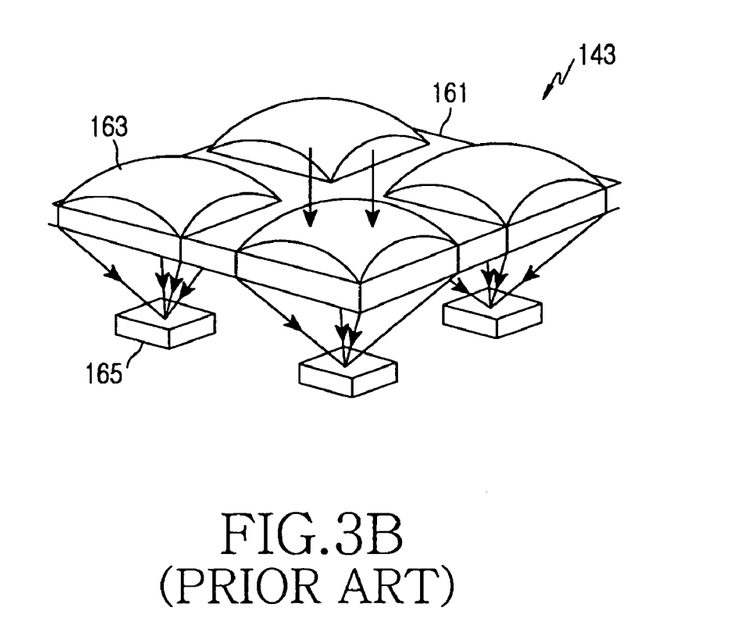

FIGS. 3a and 3b show the internal construction of an image sensor 143 of FIG. 2. The image sensor 143 as shown in FIGS. 3a and 3b, includes a faceplate 161, a micro-lens 163, and a photocell 165. The faceplate 161 is positioned between the micro-lens 163 and the photocell 165 as a medium for connecting the micro-lens 163 and the photocell 165 to each other. The micro-lens 163 performs the function of focusing optical signals which have passed through the infrared filter 141 to the photocell 165. After passing through the micro-lens 163, the optical signals become a single pixel. The photocell 165 performs the function of converting optical signals output from the micro-lens 163 into electrical signals. The infrared filter 141, faceplate 161, micro-lens 163, and photocell 165 can constitute the image sensor unit 20 shown in FIG. 1.

The optical unit 10 and the image sensor unit 20 perform the functions of optically processing incident optical signals and converting the processed signals into electrical signals. Non-uniform coatings of each lens array 130 of the optical unit 10 and reflection (e.g., flare) of incident optical signals may generate unwanted characteristics of optical signals, and a halation of the image sensor unit 20 may also vary the characteristics of optical signals. As used herein, a flare refers to an optical reflection between the lenses of the optical unit 10 and a halation refers to an optical dispersion of the faceplate 161.

The causes of the quality degradation of optical signals photographed by the optical unit 10 will now be described in greater detail. Optical signals incident from the optical unit 10 are reflected and create unwanted optical signals due to substantially three reasons, including the structure of the window glass 110 and the barrel 120, the lens array 130, and the internal structure of the barrel 120.

Firstly, the window glass 110 is spaced at a predetermined distance X from the barrel 120 as shown in FIG. 2. Specifically, the window glass 110 is positioned in front of the barrel 120 retaining the lens array 130 with a spacing therebetween, in order to prevent alien substances from contacting the lens array 130. The distance X between the window glass 110 and the front part of the barrel 120 creates a reflection wave of an incident optical signal R1. Specifically, as the incident optical signal R1 passes through the window glass 110, it is reflected by the front surface of the barrel 120 and is incident on the window glass 110. The optical signal R1 is again reflected by the surface of the window glass 110 and is incident on the lens array 130. As a result, the unwanted optical signal R1 incident on the lens array 130 is optically processed and degrades the image resolution.

Secondly, non-uniform coatings of the lens array 130 may cause incident optical signals to be reflected. Specifically, the lens array 130 includes a number of lenses. The lens array 130 shown in FIG. 2 may be made up of a focusing lens including two glass lenses and two plastic lenses. Non-uniform coatings of the lenses constituting the lens array 130 may vary the transmittance, and the lenses may generate an unwanted reflection optical signal R2.

Thirdly, optical signals reflected by the lens array 130 may be reflected within the barrel 120 and incident on the lens array 130 again. Specifically, an unwanted optical signal R3 may be generated due to reflection within the barrel 120 for retaining each lens of the lens array 130.

As described above, the non-uniform coatings of lenses constituting the optical unit 10, internal structure of the barrel 120, and spacing between the barrel 120 and the window glass 110, can each alone or in combination generate unwanted optical signals R1-R3, which may result in a flare phenomenon in the imaging system of the optical unit 10. The unwanted optical signals R1-R3 also degrade the resolution of images finally processed.

The image sensor unit 20 may also generate unwanted reflection waves.

FIG. 3*a* shows the path of incident optical signals between the optical unit 10 and the image sensor unit 20, and FIG. 3*b* shows the structure of the micro-lens 163 and the photocell 165 shown in FIG. 3*a*. After passing through the lens array 130, optical signals are incident on the micro-lens 163 via the infrared filter 141. After being focused by the micro-lens 163, the optical signals are incident on the corresponding photocell 165 and are converted into electrical signals. The micro-lens 163 and the photocell 165 constitute a pair, the number of which corresponds to the number of pixels necessary for photographing with the camera. For example, a camera having a million pixels needs a million micro-lenses 163 and a million photocells 165.

Figure 4A:
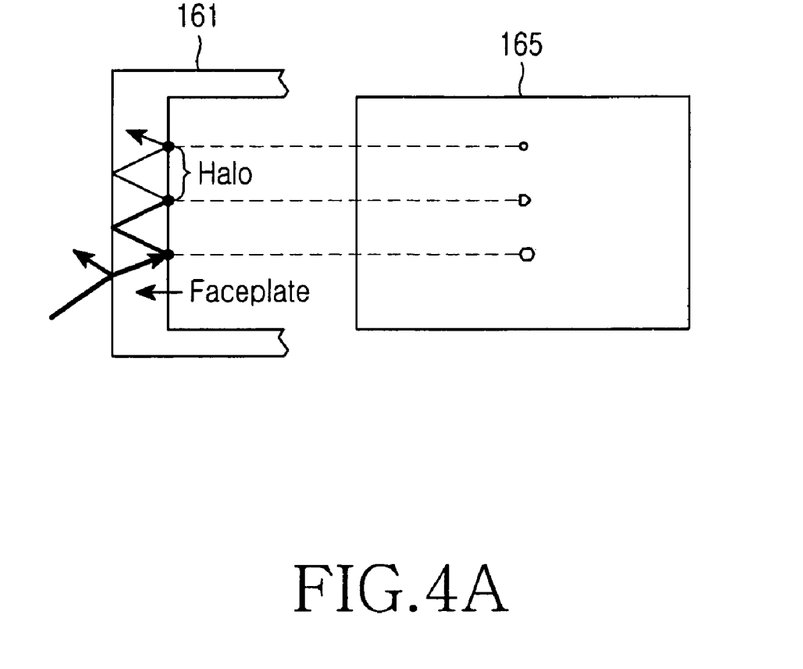
FIGS. 4*a* and 4*b* show the occurrence of a halation effect in an image sensor unit.
Figure 4B:
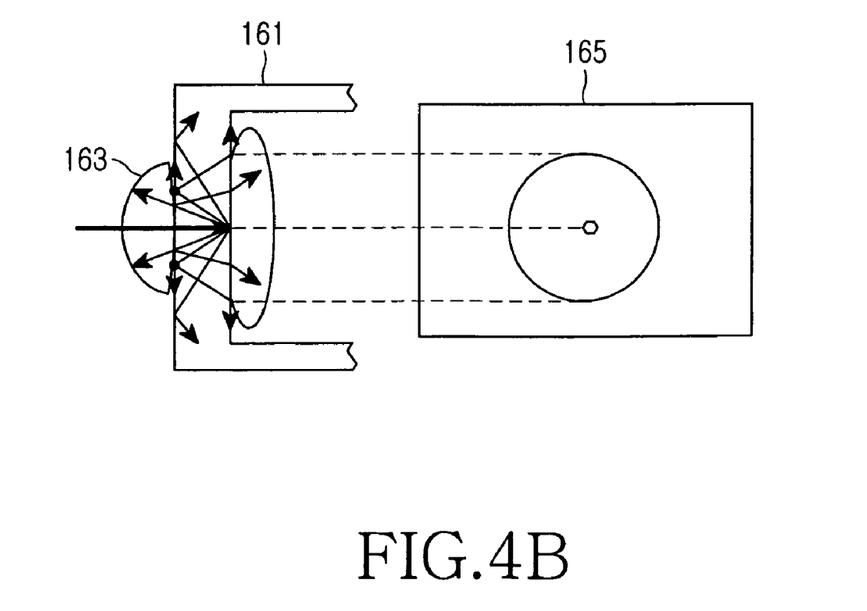

However, the image sensor unit 20 is vulnerable to a halation phenomenon caused by the faceplate 161 and the micro-lens 163 as shown in FIGS. 4*a* and 4*b*. Specifically, reflection within the faceplate 161 generates a halo as shown in FIG. 4*a* and irregular reflection caused by the micro-lens 163 generates a halo as shown in FIG. 4*b*.

As described above, the flare phenomenon occurring in the optical unit 10 and the halation phenomenon occurring in the image sensor unit 20 are major factors degrading the contrast, resolution, and color density of processed images. Such degradation of images place a limitation on improving images with the following image processing unit 30.

Accordingly, a need exists for a system and method for suppressing reflection optical signals occurring in an optical system of a camera.

SUMMARY OF THE INVENTION

Accordingly, the present invention has been made to solve the above-mentioned and other problems occurring in the prior art, and an object of the present invention is to provide a camera device that is capable of suppressing reflection optical signals occurring in an optical system of a camera.

Another object of the present invention is to provide a device that is capable of suppressing optical signals reflected by a window glass of a lens in a camera device.

Another object of the present invention is to provide a device that is capable of suppressing optical signals reflected by a lens in a camera device.

Another object of the present invention is to provide a device that is capable of suppressing optical signals reflected within a barrel for retaining a lens in a camera device.

Another object of the present invention is to provide a device that is capable of controlling a halation phenomenon occurring in an image sensor of a camera device.

BRIEF DESCRIPTION OF THE DRAWINGS

The above and other objects, features, and advantages of the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, a number of exemplary embodiments of the present invention will be described with reference to the accompanying drawings. In the following description of the present invention, a detailed description of known functions and configurations incorporated herein is omitted for conciseness and clarity.

The present invention is directed to suppressing a flare phenomenon caused by poor lens coating of an optical unit 10 and by surface reflection within a barrel, as well as a halation phenomenon occurring in an image sensor unit 20, in order to prevent degradation of contrast, resolution, and color density of photographed images. As used herein, a flare phenomenon refers to a phenomenon wherein reflection waves from an optical unit cause the periphery of a bright color portion of a finally processed image to appear brighter, and a halation phenomenon refers to white noise occurring near the pixels of an image sensor unit in circular and elliptical shapes.

Figure 5A:
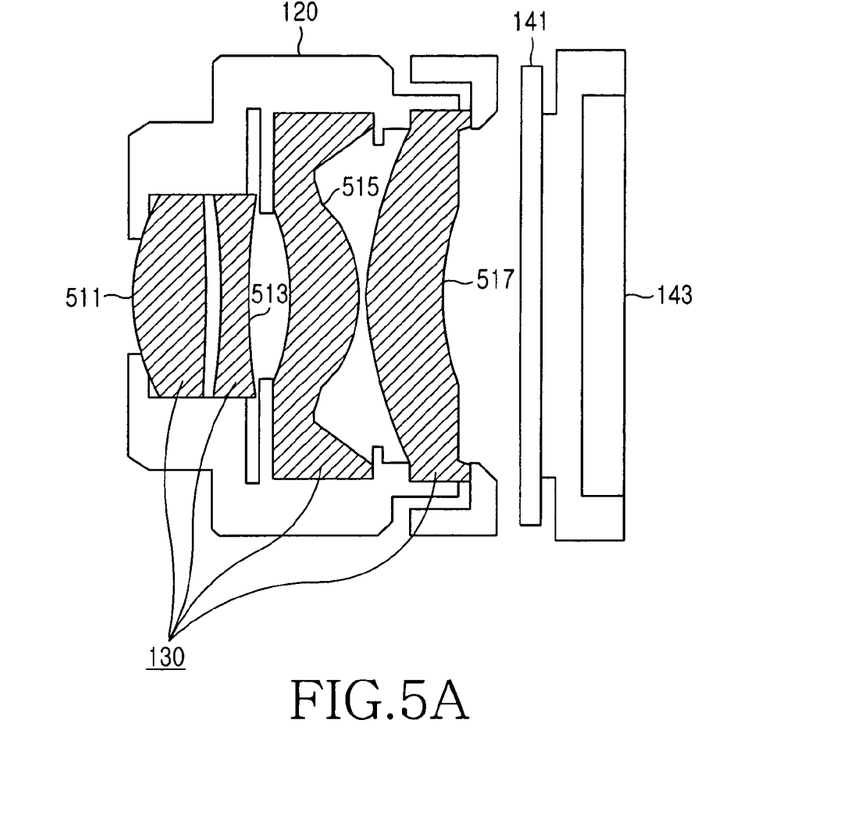
FIGS. 5*a* to 5*d* show an exemplary construction of a camera optical unit according to an embodiment of the present invention.
Figure 5B:
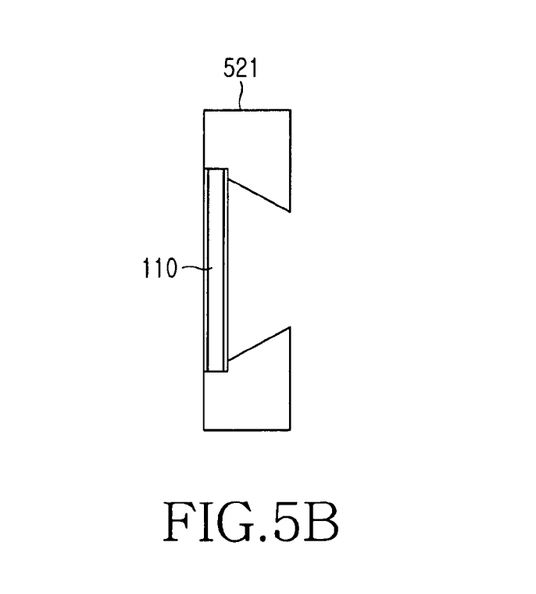
Figure 5C:
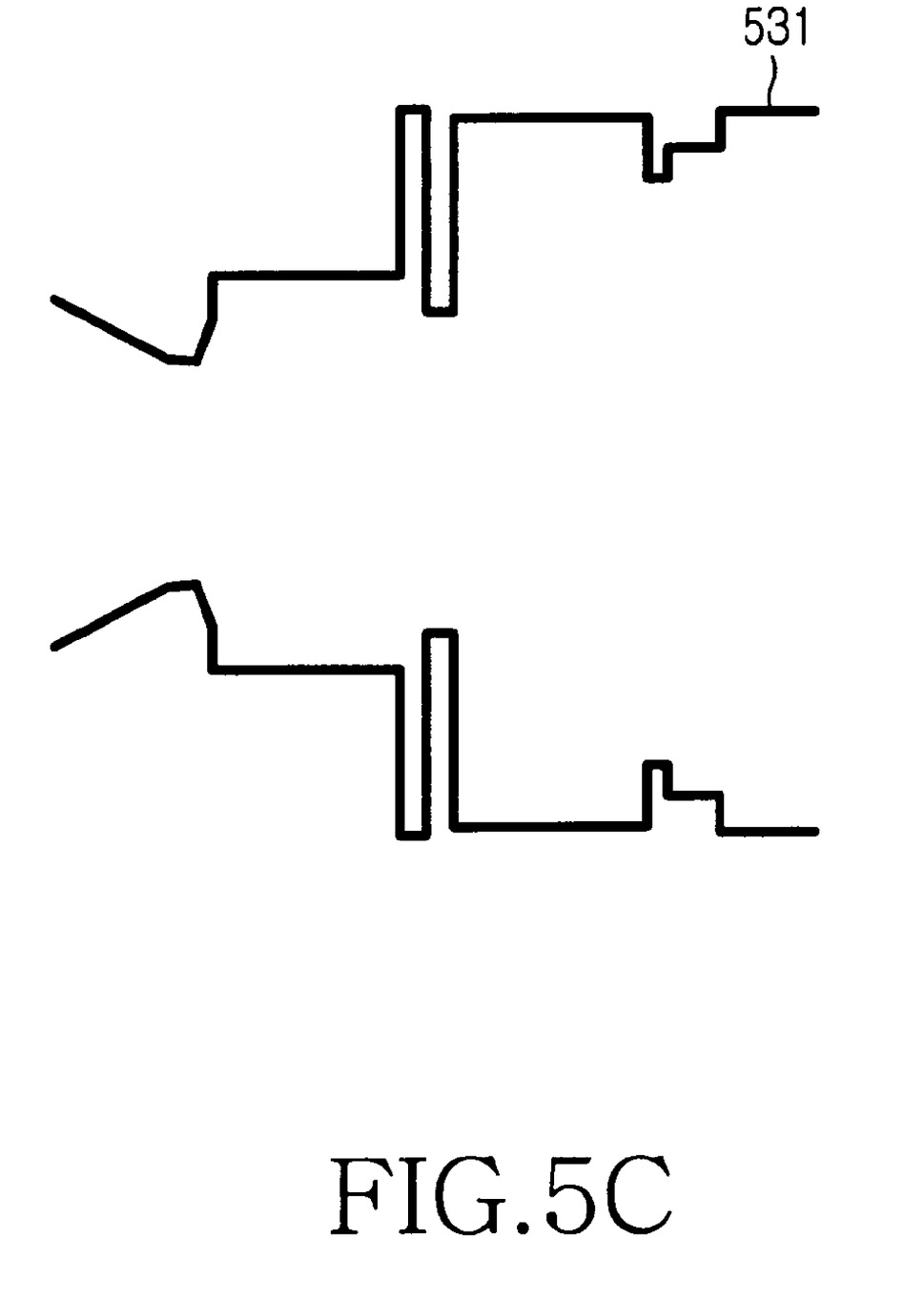
Figure 5D:
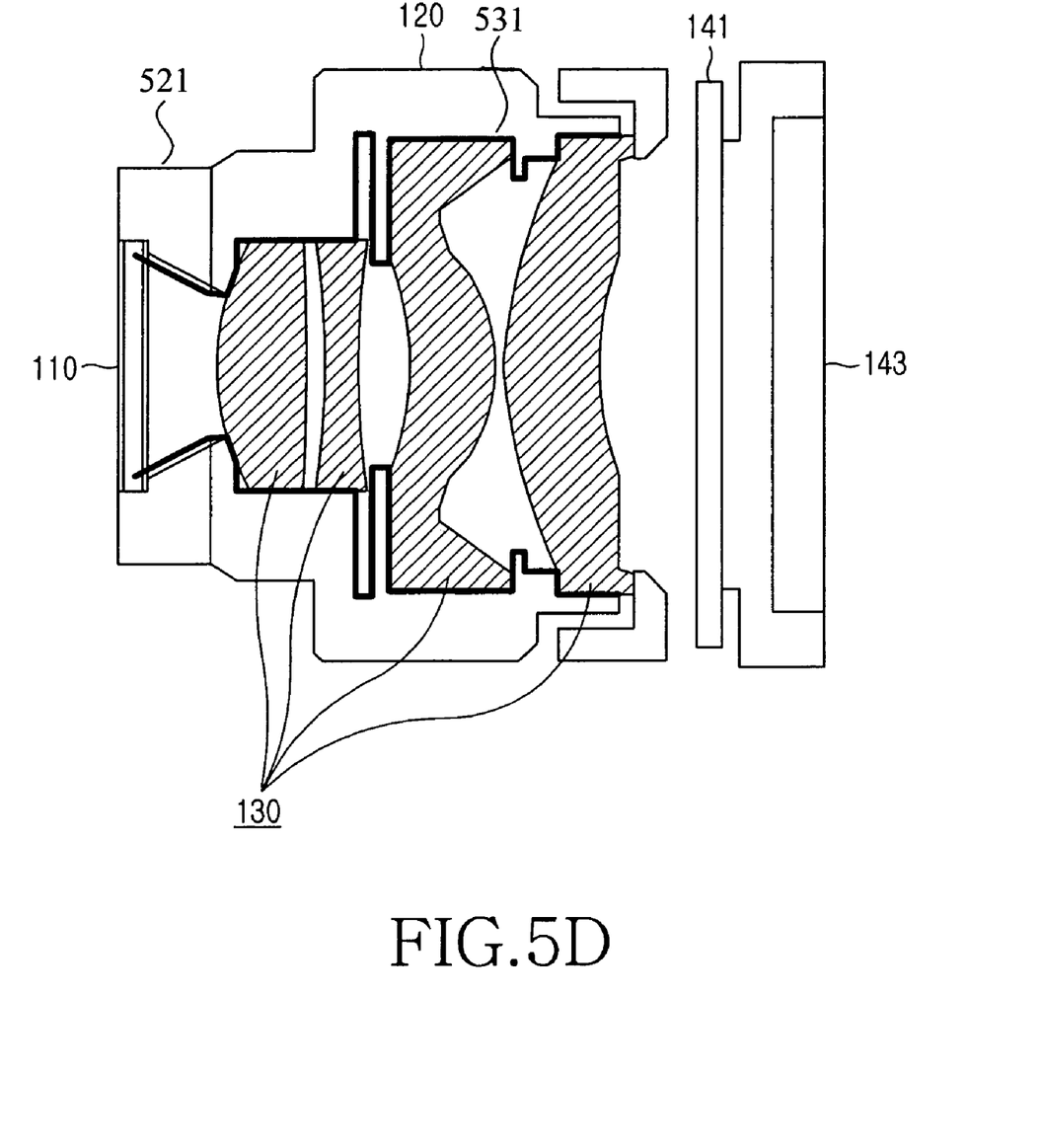

FIGS. 5*a* to 5*d* show the construction of an exemplary optical unit 10 for a camera according to an embodiment of the present invention. Specifically, FIG. 5*a* shows the construction of a barrel 120 and a lens array 130 of the optical unit 10. As a focusing lens, the lens array 130 is shown to include four lenses 511, 513, 515, and 517. FIG. 5*b* shows the construction of an exemplary member for suppressing optical signals reflected by a window glass 110 according to an embodiment of the present invention. FIG. 5*c* shows the construction of an exemplary member for suppressing optical signals reflected by the inner surface of the barrel 120 according to an embodiment of the present invention. FIG. 5*d* shows the construction of the optical unit 10 according to an embodiment of the present invention, wherein FIGS. 5*b* and 5*c* are combined with FIG. 5*a*.

Referring to FIG. 5*a*, lenses 511-517 of the lens array 130 are focusing lenses and perform the function of focusing incident optical signals. If the coating of the focusing lenses 511-517 is not uniform, incident optical signals are reflected. According to an embodiment of the present invention, the surfaces of the focusing lenses 511-517 are coated with a multi-layered thin film to suppress reflection by the lenses (i.e., anti-reflection coating), so that the phase difference between incident optical signals (incident waves) and reflected optical signals (reflection waves) is 180°. The multi-layered thin film may be made up of any one of the substances chosen from the group consisting of $TiO_2$, $SiO_2$, MgF, and ZnS. When the infrared filter 141 is coated with such a multi-layered thin film, together with the lens array 130, suppression of reflection waves improves further.

Referring to FIG. 5b, a hood 521 is attached to the front surface of the barrel 120 (not shown) to retain the window glass 110. The inside diameter of the hood 521 increases linearly as its distance from the foremost lens 511 of the lens array 130 increases, and the hood 521 has a circumferential groove formed on an end thereof to which the window glass 110 is attached. When the hood 521 is designed in this manner, the interior of the hood 521 has a predetermined slant from the window glass 110 to the first lens 511 (not shown) as shown in FIG. 5b, and the slant angle is equal to the incident angle of incident optical signals. As the barrel 120 is then connected to the window glass 110, optical signals reflected by the front surface of the barrel 120 are again reflected by the window glass 110 and reflection waves incident on the lens array 130 are suppressed. As the interior of the hood 521 attached to the front surface of the barrel 120 is slanted at a same angle as the incident angle, reflection of incident optical signals is suppressed to the maximum. When the window glass 110 is further coated with a multi-layered thin film as is the lens array 130, optical signals reflected by the window glass 110 are suppressed even more efficiently.

Referring to FIG. 5c, the barrel 120 retains lenses 511-517 constituting the lens array 130. The barrel 120 has at least two stages having different diameters positioned along the longitudinal direction thereof and grooves for retaining the lens array 130. In the exemplary embodiment of the present invention, an anti-reflection material layer 531 is applied as shown in FIG. 5c in order to suppress reflection by the inner surface of the barrel 120. The anti-reflection material layer 531 has black color for absorbing light and is preferably applied in a sand blasting method to obtain a rough surface or fine protrusions, in order to efficiently absorb optical signals. Advantageously, the anti-reflection material layer 531 is also applied to the slant surface of the hood 521 to absorb incident optical signals.

When the optical unit 10 configured as shown in FIG. 5a has a hood 521 as shown in FIG. 5b attached to the front surface of the barrel 120, and a light-absorbing material layer 531 is applied to the interior of the barrel 120 as shown in FIG. 5c, the optical unit 10 configured as shown in FIG. 5d is obtained. Specifically, the optical unit 10 according to an embodiment of the present invention as shown in FIG. 5d has a hood 521 positioned on the front surface of the barrel 120 and a window glass 110 mounted on the hood 521, such that the optical unit 10 can suppress reflection waves generated by the window glass 110 and the barrel 120. The surface of the window glass 110, the lens array 120, and the infrared filter 141 is coated with a multi-layered thin film for suppressing reflection waves to further suppress generation of optical signals reflected by the lenses. A black, preferably rough material layer 531 is applied to the interior of the barrel 120 in a sand blasting method to further suppress internal surface reflection of the barrel 120.

Figure 6A:
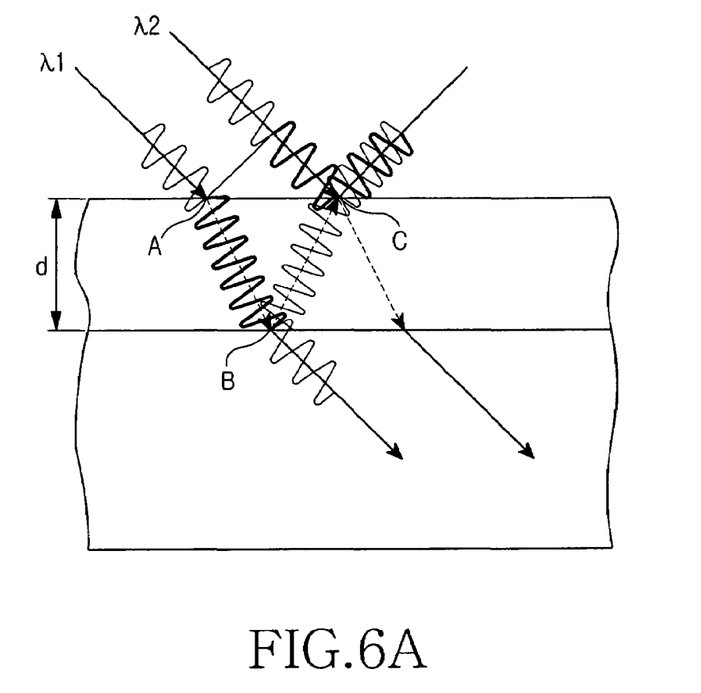
FIGS. 6*a* and 6*b* show exemplary lens coating characteristics for suppressing reflection according to an embodiment of the present invention.
Figure 6B:
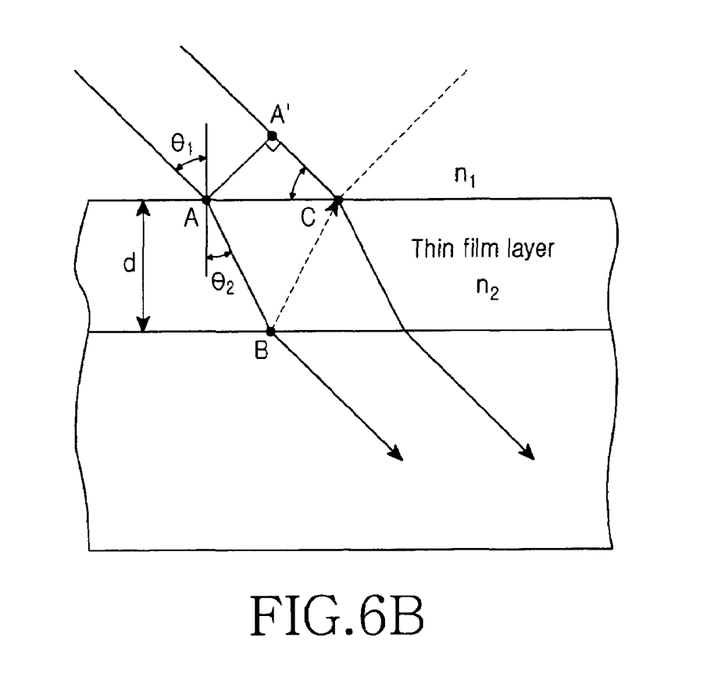

FIGS. 6a and 6b show an anti-reflection coating for suppressing reflection waves in the lens array 130, the window glass 110, and the infrared filter 141. Particularly, FIG. 6a shows the characteristics of an anti-reflection coating according to an embodiment of the present invention, and FIG. 6b shows a procedure for determining the thickness of a thin film when the anti-reflection coating is formed.

FIG. 6a shows a case wherein a first incident wave $\lambda_1$ is incident on point A, and a second incident wave $\lambda_2$ is incident on point C. The thickness d of the thin film coating layer is determined in such a manner that, when the first incident wave $\lambda_1$ has passed through the thin film coating layer and is reflected by the lens surface at point B, the phase difference between the reflection wave of the first incident wave $\lambda_1$ and the second incident wave $\lambda_2$ incident on point C is 180°. When the phase difference at point C between the reflection wave of the first incident wave $\lambda_1$ and the reflection wave of the second incident wave $\lambda_2$ is 180°, the reflection wave of the first incident wave $\lambda_1$ and the reflection wave of the second incident wave $\lambda_2$ generated at point C counterbalance each other as shown in FIG. 6a.

As described above, the reflection wave of the first incident wave $\lambda_1$ counterbalances the reflection wave of the second incident wave $\lambda_2$ when the phase difference is 180°. In the exemplary embodiment, the surface of the window glass 110, lens array 130, and infrared filter 141 is coated with the anti-reflection thin film. The material of the thin film and the thickness of the coating layer are critical factors for counterbalancing the reflection waves of the first and second incident waves $\lambda_1$ and $\lambda_2$. Specifically, the material of the thin film determines the reflection angle and refraction angle of incident optical signals, and the thickness of the coating layer determines the distance to obtain a phase difference of 180° between the reflection waves. In the exemplary embodiment, the material of the thin film may be any one of the materials chosen from the group consisting of $TiO_2$, $SiO_2$, MgF, and ZnS, and the thickness of the coating layer can be determined by Equation 1 given below, $$A'C = 2d\ \tan\theta_2 \sin\theta_1 \quad \text{Equation 1}$$
$$ABC = 2d(\cos\theta_2 + \tan\theta_2 \sin\theta_2)$$
$$= 2d/\cos\theta_2$$
$$\phi_1 = \frac{A'C}{\lambda_1} 2\pi = \frac{2\pi 2d\ \tan\theta_2 \sin\theta_1}{\lambda_1} = \frac{2\pi f 2d\ \tan\theta_2 \sin\theta_1}{u_1}$$
$$\phi_2 = \frac{ABC}{\lambda_2} 2\pi = \frac{2\pi f 2d}{u_2 \cos\theta_2}$$
$$\Delta\phi = \phi_1 - \phi_2 = \frac{2\pi f 2d}{u_2 \cos\theta_2} - \frac{2\pi f 2d\ \tan\theta_2 \sin\theta_1}{u_1}$$
$$= 2d \cdot 2\pi f \left[ \frac{1}{u_2 \cos\theta_2} - \frac{\frac{n_2}{n_1} \sin^2\theta_2}{u_1 \cos\theta_2} \right], \frac{\sin\theta_1}{\sin\theta_2} = \frac{n_2}{n_1} = n$$
$$= 2d \cdot 2\pi f \left[ \frac{1 - \frac{n_2}{n_1} \frac{u_2}{u_1} \sin^2\theta}{u_2 \cos\theta_2} \right]$$
$$= 2d \cdot 2\pi f \left[ \frac{\cos\theta_2}{u_2} \right] = \pi(2k+1)\ k = \text{integer}$$
$$\therefore 4d \cdot \frac{f}{u_2} \cos\theta_2 = (2k+1)$$
$$4d \cdot \frac{1}{\lambda_2} \cos\theta_2 = (2k+1)\ \frac{f\lambda_1}{f\lambda_2} = \frac{u_1}{u_2} = \frac{n_2}{n_1}$$
$$4d \cdot \frac{1}{\lambda_1} \frac{n_1}{n_2} \cos\theta_2 = (2k+1)\ \frac{1}{\lambda_2} = \frac{1}{\lambda_1} \frac{n_1}{n_2}$$
$$4d \cos\theta_2 / n = \lambda_1 (2k+1)$$

-continued $$d = \frac{n\lambda_1(2k+1)}{4\cos\theta_2}$$

wherein, $\lambda_1$ is the first incident wave, $\lambda_2$ is the second incident wave, $\theta_1$ is the incident angle of the first incident wave, $\theta_2$ is the refraction angle of the first incident wave, d is the thickness of the coating layer, $n_1$ is the refraction ratio of air, $n_2$ is the refraction ratio of the coating layer, A'C is the path of the first incident wave, and ABC is the path of the second incident wave.

The interference between the reflection waves is removed only when the difference between the phases $\theta_1$ and $\theta_2$ of the incident waves $\lambda_1$ and $\lambda_2$ is 180°×n (n: integer), as is clear from Equation 1. The thickness d of the coating layer is obtained by expanding equations under the above assumption as shown in Equation 1.

Figure 7:
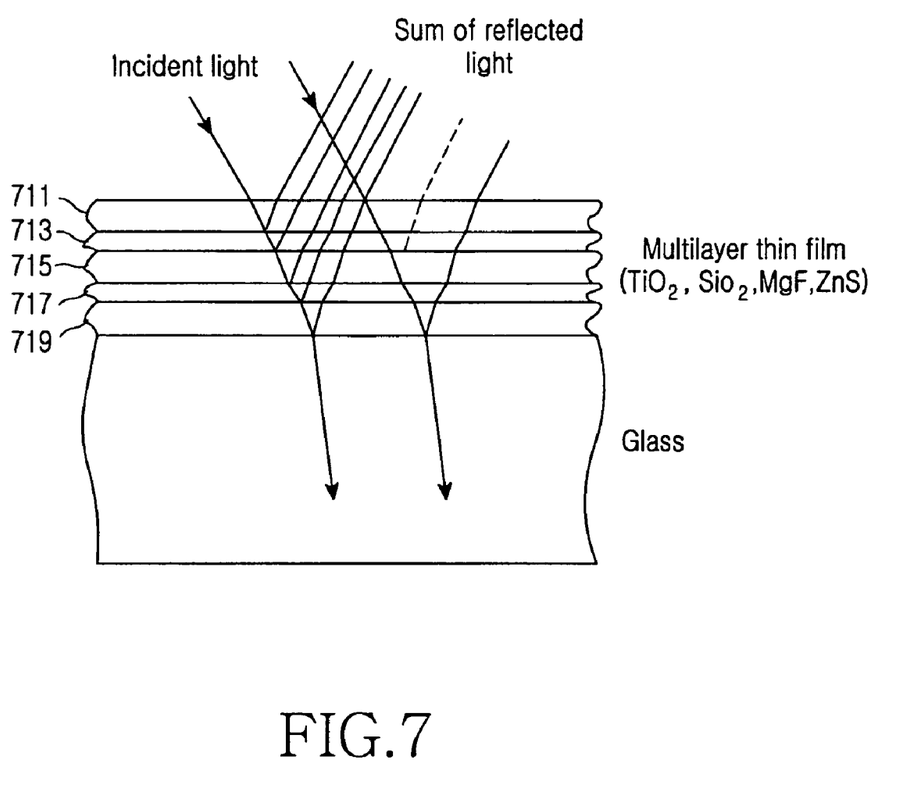
FIG. 7 shows exemplary characteristics of a multi-layered thin film for suppressing reflection of incident waves according to an embodiment of the present invention.

FIGS. 6a and 6b show an example of a coating for suppressing the reflection waves of short-wavelength waves. Incident optical signals in this case include infrared rays and ultraviolet rays, as well as visible rays. Visible rays are signals having a number of wavelengths. Therefore, in order to optically process incident visible rays, a multi-layered thin film coating according to the wavelength of each signal is necessary. Specifically, thin films corresponding to the wavelength of the respective signals constituting the optical signals must be formed in multiple layers to suppress the reflection waves of incident optical signals. FIG. 7 shows an example of a coating for suppressing input reflection waves of optical signals having a number of wavelengths.

Referring to FIG. 7, incident optical signals (in this case, visible rays) are signals having different wavelengths. A thin film coating is formed using a material and a thickness corresponding to each of the signals. The material of the thin film coating is the same as that described above, and the thickness of the coating layer is determined by Equation 1. Visible rays have wavelengths of about 390 nm-780 nm. More specifically, wavelengths of visible rays can be classified as follows: 780-622 nm corresponds to red, 622-597 nm corresponds to orange, 597-577 nm corresponds to yellow, 577-492 nm corresponds to green, 492-455 nm corresponds to blue, and 455-390 nm corresponds to violet.

Figure 8A:
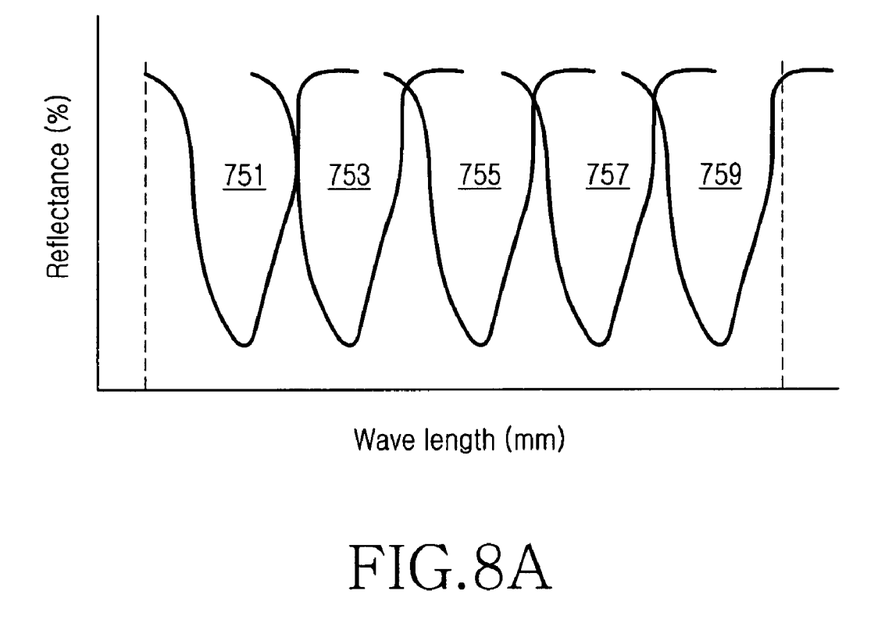
FIGS. 8*a* and 8*b* show exemplary reflectance characteristics of a lens coated with a multi-layered thin film as shown in FIG. 7.
Figure 8B:
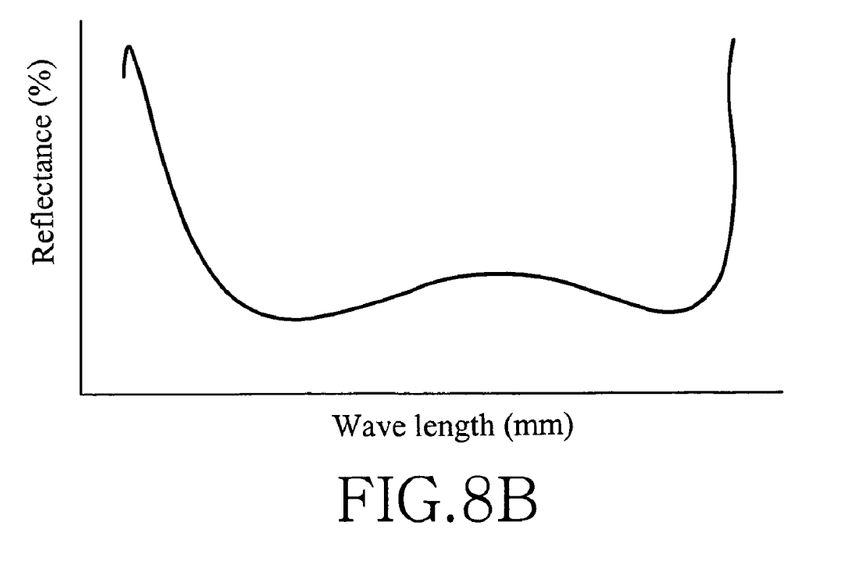

In order to suppress reflection waves related to the respective wavelengths of incident visible rays, the surface of the lens array 130 is coated with a multi-layered thin film as shown in FIG. 7. Suppression of reflection waves of R (red), G (green), and B (blue), which are used as important parameters during image processing, is crucial. Particularly, the lens array 130, window glass 110, and infrared filter 141 are preferably coated with a multi-layered thin film in such a manner that reflection waves of the R, G, and B signals are suppressed. When the coating layers (i.e., multilayer thin films formed of $TiO_2$, $SiO_2$, MgF, and/or ZnS) are formed (that is, sequentially formed or stacked) as indicated by reference numerals 711-719 in FIG. 7, reflection waves of incident waves corresponding to the respective coating layers can be suppressed as indicated by reference numerals 751-759 in FIG. 8a. FIGS. 8a and 8b show exemplary reflectance characteristics of a lens coated with a multi-layered thin film as shown in FIG. 7. FIG. 8a is a plot of each layer illustrating a percent reflectance along a vertical axis, and a wavelength along a horizontal axis. FIG. 8b is a plot of the combination of the layers illustrating a percent reflectance along a vertical axis, and a wavelength along a horizontal axis. When the lens array 130 is coated with a multi-layered thin film as shown in FIG. 7, reflection waves related to the wavelengths in the visible ray bandwidth can be suppressed. When a multi-layered thin film coating is formed against some wavelengths (i.e., multi-layered) in the visible ray region as shown in FIG. 7, the reflectance for each wavelength is determined and used as a whole to suppress reflection waves for all the wavelengths as shown in FIG. 8b.

Figure 9:
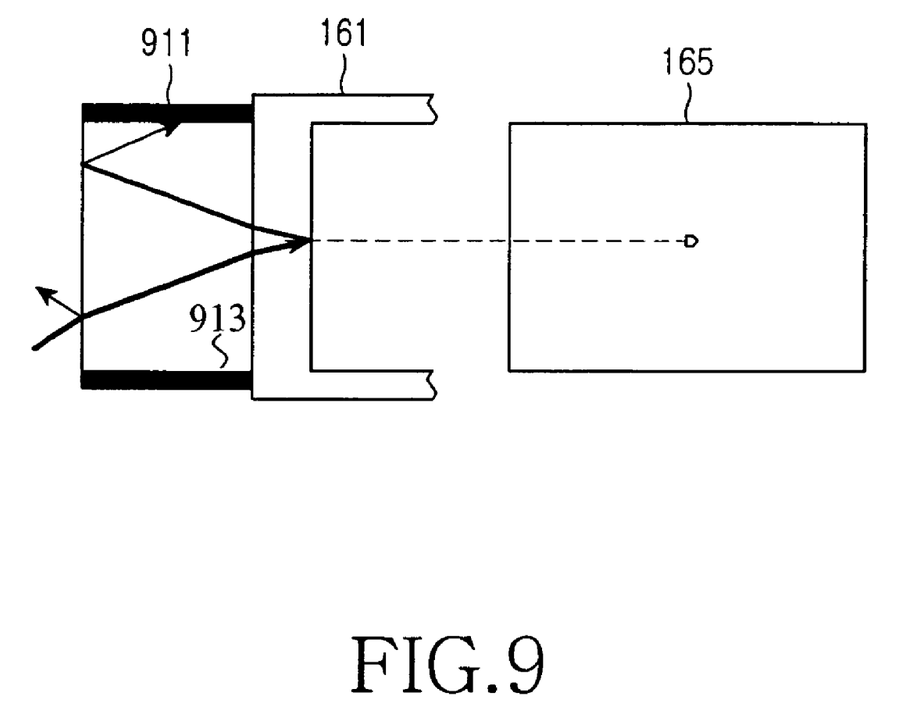
FIG. 9 shows an exemplary structure for suppressing halation characteristics in an image sensor unit according to an embodiment of the present invention.

FIG. 9 shows a structure for suppressing a halation occurring in the image sensor unit 20.

Referring to FIG. 9, the number of image sensors constituting the image sensor unit 20 corresponds to the number of pixels of an image photographed by the camera. As the image sensor, the micro-lens 163 and the photocell 165 constitute a pair with the faceplate 161 interposed therebetween. An anti-halation disk 911 is positioned on the upper end of the faceplate 161 contacting the micro-lens 163. A black material layer 913 is applied to the interior of the disk 911 surrounding the micro-lens 163. Optical signals reflected by the micro-lens 163 and the faceplate 161 are then absorbed by the lateral surface of the disk 911, as shown in FIG. 9, and the reflection waves are suppressed.

As described above, the optical unit suppresses reflection waves of rays incident from the lens array, the window glass, the interior of the barrel, and the micro-lens in the camera device and improves the resolution, contrast, and color density of images finally processed. When the above optical unit embodiments are used, the image processing unit can process high-quality optical signals and efficiently improve the quality of images finally displayed.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical device for a camera comprising:
   a lens array for focusing incident optical signals;
   a window glass positioned in front of the lens array to prevent alien substances from contacting the lens array; and
   a barrel for retaining the lenses of the lens array, wherein each lens of the lens array is substantially coated with multi-layered thin films to suppress respective reflection waves of incident optical signals having different wavelengths, and of such a thickness that causes a phase of reflection waves reflected through the thin films to be an inverse of a phase of reflection waves reflected at a surface of the lens; and
   wherein the thickness, d, is determined by the following equation:
   where $\lambda_1$ is a first incident wave, $\lambda_2$ is a second incident wave, $\theta_1$ is a incident angle of the first incident wave, $\theta_2$ is a refraction angle of the first incident wave, $n_1$ is a refraction ratio of air, $n_2$ is a refraction ratio of the coating layer, A'C is the path of the first incident wave, and ABC is the path of the second incident wave, $$A'C = 2d\tan\theta_2\sin\theta_1$$

$$ABC = 2d(\cos\theta_2 + \tan\theta_2\sin\theta_2)$$

$$= \frac{2d}{\cos\theta_2}$$

-continued $$\phi_1 - \frac{A'C}{\lambda_1} 2\pi = \frac{2\pi 2d\tan\theta_2\sin\theta_1}{\lambda_1} = \frac{2\pi f 2d\tan\theta_2\sin\theta_1}{u_1}$$

$$\phi_2 - \frac{ABC}{\lambda_2} 2\pi = \frac{2\pi f 2d}{u_3\cos\theta_2}$$

$$\Delta\phi = \phi_1 - \phi_2 = \frac{2\pi f}{u_2}\frac{2d}{\cos\theta_2} - \frac{2\pi f 2d\tan\theta_2\sin\theta_1}{u_1}$$

$$= 2d \cdot 2\pi f \left[ \frac{1}{u_2\cos\theta_2} - \frac{\frac{n_2}{n_1}\sin^2\theta_2}{u_1\cos\theta_2} \right], \frac{\sin\theta_1}{\sin\theta_2} = \frac{n_2}{n_1} = n$$

$$= 2d \cdot 2\pi f \left[ \frac{1 - \frac{n_3}{n_1}\frac{u_2}{u_1}\sin^3\theta}{u_2\cos\theta_2} \right]$$

$$= 2d \cdot 2\pi f \left[ \frac{\cos\theta_2}{u_2} \right] - \pi(2k+1) \ k = \text{integer}$$

$$\therefore 4d \cdot \frac{f}{u_2}\cos\theta_2 = (2k+1)$$

$$4d \cdot \frac{1}{\lambda_2}\cos\theta_2 = (2k+1) \ \frac{f\lambda_1}{f\lambda_2} = \frac{u_1}{u_2} = \frac{n_2}{n_1}$$

$$4d \cdot \frac{1}{\lambda_2}\frac{n_1}{n_2}\cos\theta_2 = (2k+1) \ \frac{1}{\lambda_2} = \frac{1}{\lambda_1}\frac{n_1}{n_2}$$

$$4d\cos\theta_2/n = \lambda_1(2k+1)$$

$$d = \frac{n\lambda_1(2k+1)}{4\cos\theta_2}.$$

2. The optical device as claimed in claim 1, wherein the barrel comprises:
a light-absorbing material applied to an interior thereof to suppress surface reflection within the barrel.

3. The optical device as claimed in claim 1, further comprising:
a hood connected to a front surface of the barrel to retain the window glass and wherein an interior of the hood is slanted at a same angle as an incident angle of incident waves from a surface contacting the window glass to another surface contacting a foremost lens of the lens array.

4. The optical device as claimed in claim 3, further comprising:
a light-absorbing material applied to the internal slant surface of the hood and comprising fine protrusions to absorb reflection waves from the window glass and the lens.

5. The optical device as claimed in claim 1, wherein the window glass comprises:
a coating comprising multi-layered thin films to suppress respective reflection waves of incident optical signals having different wavelengths, and of such a thickness that causes a phase of reflection waves reflected through the thin films to be an inverse of a phase of reflection waves reflected at a surface of the glass.

6. The optical device as claimed in claim 1, further comprising:
an infrared filter for interrupting infrared rays from optical signals focused at the lens array; and
an image sensor unit comprising a plurality of micro-lenses for focusing optical signals output from the infrared filter into pixel-sized optical signals, a plurality of photocells for converting pixel-sized optical signals output from the micro-lens into electrical signals, and a photoplate as a medium therebetween, wherein the image sensor is configured to convert optical signals output from the infrared filter into electrical signals in a pixel unit.

7. The optical device as claimed in claim 6, wherein the infrared filter comprises:
a coating comprising multi-layered thin films to suppress reflection waves of wavelengths in a visible ray bandwidth, and of such a thickness that causes a phase of reflection waves reflected through the thin films to be an inverse of a phase of reflection waves reflected at a surface of the infrared filter.

8. The optical device as claimed in claim 6, wherein the image sensor unit further comprises:
a disk positioned on an upper side of the micro-lens, wherein an interior of the lateral surfaces of the disk is coated to absorb reflection waves generated from the micro-lens.

9. An optical device for a camera comprising:
a lens array for focusing incident optical signals;
a window glass for preventing alien substances from contacting the lens array;
a barrel for retaining the lenses of the lens array and which has a light-absorbing material applied to an interior thereof, wherein the light-absorbing material comprises fine protrusions to suppress internal surface reflection;
a hood comprising a first side connected to a front surface of the barrel and a second side for retaining the window glass, wherein the interior of which is slanted at a same angle as an incident angle of incident waves from a surface contacting the window glass to another surface contacting a foremost lens of the lens array, wherein
each lens of the lens array is substantially coated with multi-layered thin films to suppress respective reflection waves of incident optical signals having different wavelengths, and with such a thickness that causes a phase of reflection waves reflected through the thin films to be an inverse of a phase of reflection waves reflected at a surface of the lens, and
wherein the thickness, d, is determined by the following equation:
where $\lambda_1$ is a first incident wave, $\lambda_2$ is a second incident wave, $\theta_1$ is a incident angle of the first incident wave, $\theta_1$ is a refraction angle of the first incident wave, $n_1$ is a refraction ratio of air, $n_2$ is a refraction ratio of the coating layer, A'C is the path of the first incident wave, and ABC is the path of the second incident wave, $$A'C = 2d\tan\theta_2\sin\theta_1$$

$$ABC = 2d(\cos\theta_2 + \tan\theta_2\sin\theta_2)$$

$$= \frac{2d}{\cos\theta_2}$$

$$\phi_1 - \frac{A'C}{\lambda_1} 2\pi = \frac{2\pi 2d\tan\theta_2\sin\theta_1}{\lambda_1} = \frac{2\pi f 2d\tan\theta_2\sin\theta_1}{u_1}$$

$$\phi_2 - \frac{ABC}{\lambda_2} 2\pi = \frac{2\pi f 2d}{u_3\cos\theta_2}$$

$$\Delta\phi = \phi_1 - \phi_2 = \frac{2\pi f}{u_2}\frac{2d}{\cos\theta_2} - \frac{2\pi f 2d\tan\theta_2\sin\theta_1}{u_1}$$

$$= 2d \cdot 2\pi f \left[ \frac{1}{u_2\cos\theta_2} - \frac{\frac{n_2}{n_1}\sin^2\theta_2}{u_1\cos\theta_2} \right], \frac{\sin\theta_1}{\sin\theta_2} = \frac{n_2}{n_1} = n$$

$$= 2d \cdot 2\pi f \left[ \frac{1 - \frac{n_3}{n_1}\frac{u_2}{u_1}\sin^3\theta}{u_2\cos\theta_2} \right]$$

-continued $$= 2d \cdot 2\pi f \left[\frac{\cos\theta_2}{u_2}\right] - \pi(2k+1) \quad k = \text{integer}$$

$$\therefore 4d \cdot \frac{f}{u_2}\cos\theta_2 = (2k+1)$$

$$4d \cdot \frac{1}{\lambda_2}\cos\theta_2 = (2k+1) \quad \frac{f\lambda_1}{f\lambda_2} = \frac{u_1}{u_2} = \frac{n_2}{n_1}$$

$$4d \cdot \frac{1}{\lambda_2}\frac{n_1}{n_2}\cos\theta_2 = (2k+1) \quad \frac{1}{\lambda_2} = \frac{1}{\lambda_1}\frac{n_1}{n_2}$$

$$4d\cos\theta_2/n = \lambda_1(2k+1)$$

$$d = \frac{n\lambda_1(2k+1)}{4\cos\theta_2}.$$

10. The optical device as claimed in claim 9, wherein the window glass comprises:

a coating comprising multi-layered thin films to suppress respective reflection waves of incident optical signals having different wavelengths, and with such a thickness that causes a phase of reflection waves reflected through the thin films to be an inverse of a phase of reflection waves reflected at a surface of the glass.

11. The optical device as claimed in claim 9, further comprising:

an infrared filter for interrupting infrared rays from optical signals focused at the lens array; and an image sensor unit comprising a plurality of micro-lenses for focusing optical signals output from the infrared filter into pixel-sized optical signals, a plurality of photocells for converting pixel-sized optical signals output from the micro-lens into electrical signals, and a photoplate as a medium therebetween, wherein the image sensor is configured to convert optical signals output from the infrared filter into electrical signals in a pixel unit.

12. The optical device as claimed in claim 11, wherein the infrared filter comprises:

a coating comprising multi-layered thin films to suppress respective reflection waves of incident optical signals having different wavelengths, and with such a thickness that causes a phase of reflection waves reflected through the thin films to be an inverse of a phase of reflection waves reflected at a surface of the infrared filter.

13. The optical device as claimed in claim 11, wherein the image sensor unit further comprises:

disk positioned on an upper side of the micro-lens and wherein an interior of the lateral surfaces of the disk is coated to absorb reflection waves generated from the micro-lens.

* * * * *